United States Patent
Peter (10) Patent No.: US 7,296,784 B2
(45) Date of Patent: Nov. 20, 2007

(54) ADJUSTABLE HEIGHT LEVELING LEG

(75) Inventor: Gary D. Peter, Middlebury, IN (US)

(73) Assignee: Actuant Corp., Milwaukee, WI (US)

( * ) Notice: Subject to any disclaimer, the term of this patent is extended or adjusted under 35 U.S.C. 154(b) by 321 days.

(21) Appl. No.: 11/005,254

(22) Filed: Dec. 6, 2004

(65) Prior Publication Data

US 2005/0140100 A1 Jun. 30, 2005

Related U.S. Application Data

(60) Provisional application No. 60/527,809, filed on Dec. 8, 2003.

(51) Int. Cl.
*B60S 9/02* (2006.01)
(52) U.S. Cl. ............ 254/418; 254/423; 254/425
(58) Field of Classification Search ........ 254/418, 254/423, 419, 420–425
See application file for complete search history.

(56) References Cited

U.S. PATENT DOCUMENTS

| | | | |
|---|---|---|---|
| 2,519,364 A * | 8/1950 | Fredholm | ............ 254/424 |
| 3,148,795 A | 9/1964 | Leach | |
| 3,614,064 A * | 10/1971 | Bennett | ............ 254/418 |
| 3,689,029 A | 9/1972 | Bargman, Jr. | |
| 3,709,467 A | 1/1973 | Mann | |
| 3,758,074 A | 9/1973 | Jeffries et al. | |
| 3,873,126 A | 3/1975 | Hewett | |
| 3,897,044 A | 7/1975 | Tallman | |
| 3,976,310 A | 8/1976 | Carr | |
| 4,084,789 A * | 4/1978 | Francis | ............ 254/418 |
| 5,176,391 A | 1/1993 | Schneider et al. | |
| 5,188,379 A * | 2/1993 | Krause et al. | ............ 254/423 |
| 5,348,258 A | 9/1994 | Rasmussen | |
| D376,239 S | 12/1996 | Rasmussen | |

* cited by examiner

*Primary Examiner*—Lee D Wilson
(74) *Attorney, Agent, or Firm*—Quarles & Brady LLP (57) ABSTRACT

A leveling leg assembly adapted for mounting to a vehicle includes an outer member and an inner member telescoped slidably into the outer member. The inner member has a first end extending beyond the outer member. The inner member is telescopically driven out of the outer member from a retracted position toward an extended position. A first bracket is fixed to the outer member, and a second bracket is fixable to the vehicle, wherein one of the first and second brackets has a plurality of holes formed therethrough, and the other of the first and second brackets has at least one hole formed therethrough that is aligned with at least one of the plurality of holes to fix the first bracket relative to the second bracket at a desired height relative to the vehicle. At least one hole of the plurality of holes formed through the one of the first and second brackets is not aligned with the at least one hole formed through the other of the first and second brackets to provide an alternate mounting height for the first bracket relative to the vehicle.

30 Claims, 6 Drawing Sheets

ADJUSTABLE HEIGHT LEVELING LEG

CROSS REFERENCES TO RELATED APPLICATIONS

This application claims the priority benefit of U.S. Provisional Patent Application No. 60/527,809 filed on Dec. 8, 2003.

STATEMENT REGARDING FEDERALLY SPONSORED RESEARCH

Not Applicable

FIELD OF THE INVENTION

This invention relates to leveling legs for vehicles, and particularly, a hydraulic leveling leg assembly for use with a recreational vehicle.

DESCRIPTION OF THE BACKGROUND ART

Vehicles, such as a recreational vehicle or semi-trailer, incorporate jacks to support, level, or raise the vehicle. These jacks are commonly known as leveling legs or landing gear, and include at least one extendible member that is telescopically driven from to engage the ground. The extendible member telescopes from a static member fixed to the vehicle, such as by welding, bolting, and the like, at a predetermined height above the ground.

Variations in the height of different vehicles above the ground require custom fitting of the jacks to the specific vehicle in order to fix the jack relative to the vehicle. Moreover, once a jack is fixed to a vehicle, the height of the static member relative to the is fixed and cannot be easily changed. This can be a problem if larger tires are placed on the vehicle, or a dip beneath the vehicle, results in the extendible member being to short to properly engage the ground. Accordingly, a need exists for an adjustable height jack, leveling leg, or landing gear, for vehicles.

SUMMARY OF THE INVENTION

The present invention provides a leveling leg assembly adapted for mounting to a vehicle. The assembly includes an outer member and an inner member telescoped slidably into the outer member. The inner member has a first end extending beyond the outer member. Means for driving the inner member telescopically drives the inner member out of the outer member from a retracted position toward an extended position. A first bracket is fixed to the outer member, and a second bracket is fixable to the vehicle, wherein one of the first and second brackets has a plurality of holes formed therethrough, and the other of the first and second brackets has at least one hole formed therethrough that is aligned with at least one of the plurality of holes to fix the first bracket relative to the second bracket at a desired height relative to the vehicle. At least one hole of the plurality of holes formed through the one of the first and second brackets is not aligned with the at least one hole formed through the other of the first and second brackets to provide an alternate mounting height for the first bracket relative to the vehicle. In one embodiment the second bracket is boltable to the vehicle.

A general objective of the present invention is to provide a leveling leg assembly that is height adjustable relative to a vehicle. This objective is accomplished by providing a leveling leg with first and second brackets for mounting the leg to the vehicle, wherein at least one hole of the plurality of holes formed through one of the first and second brackets is not aligned with at least one hole formed through the other of the first and second brackets to provide an alternate mounting height for the first bracket relative to the vehicle.

Another objective of the present invention is to provide an leveling leg assembly that is easily adjustable in height relative to the vehicle. This objective is accomplished by providing a bolt on-bolt on assembly that includes a first bracket that is fixed to an actuator and boltable to a second bracket that is boltable to the vehicle.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Referring to FIGS. 1-6, a vehicle 10, such as a recreational vehicle, trailer, or the like, has one or more extendible leveling leg assemblies 12. Each assembly 12 has an outer member 14 fixed to the vehicle 10 and a telescoping inner member 16. Hydraulic fluid 19 pumped into the outer member 14 drives the slidably moveable inner member 16 from a retracted position, shown in FIG. 2, to an extended position, shown in FIG. 4, relative to the outer member 14. A return spring 20 urges the inner member 16 telescopically into the outer member 14 toward the retracted position. Advantageously, a first bracket 22 fixed to the outer member 14 includes a plurality of hole pairs 24 that are alignable with one or more hole pairs 26 formed through a second bracket 28 fixed to the vehicle 10 to fix the assembly 12 to the vehicle 10 at a desired height.

Figure 1:
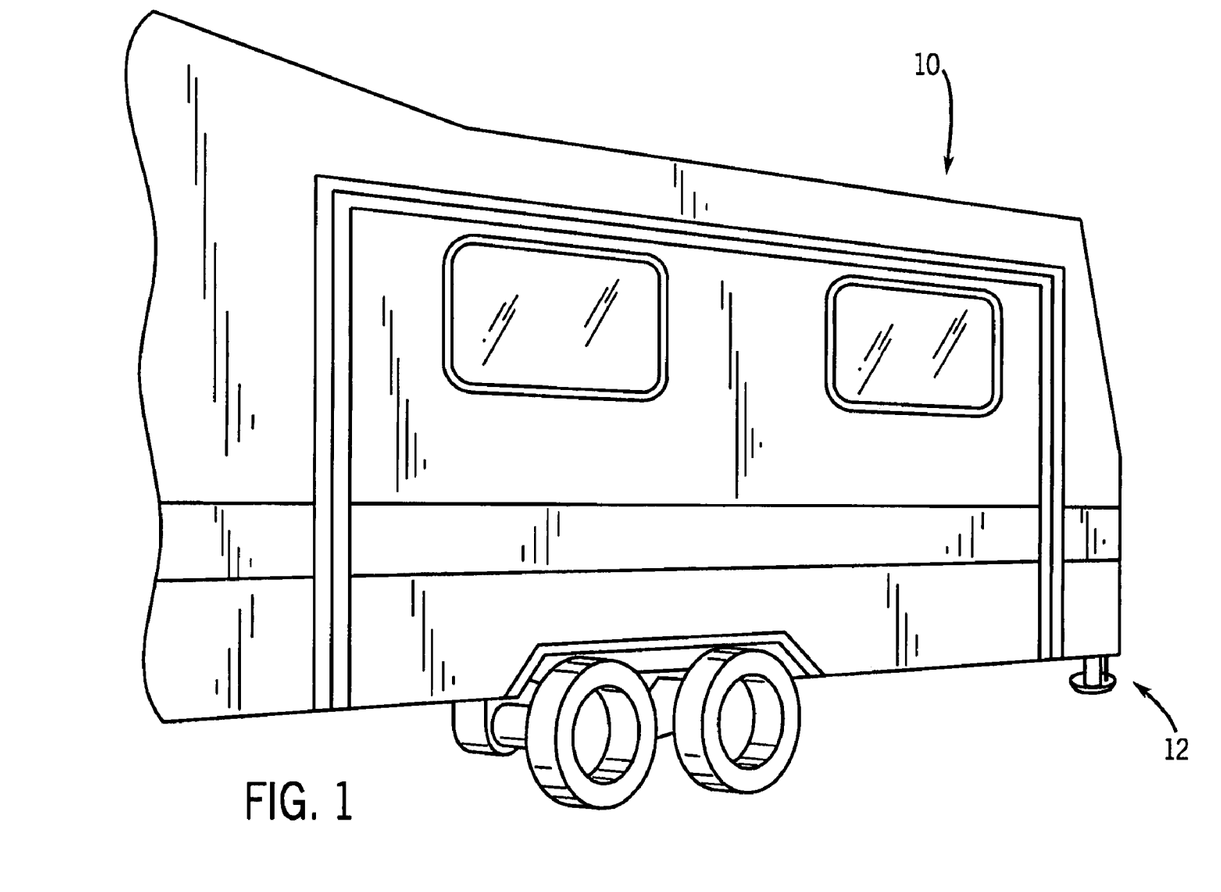
FIG. 1 is a perspective view of a recreational vehicle incorporating the present invention.
Figures 2, 3:
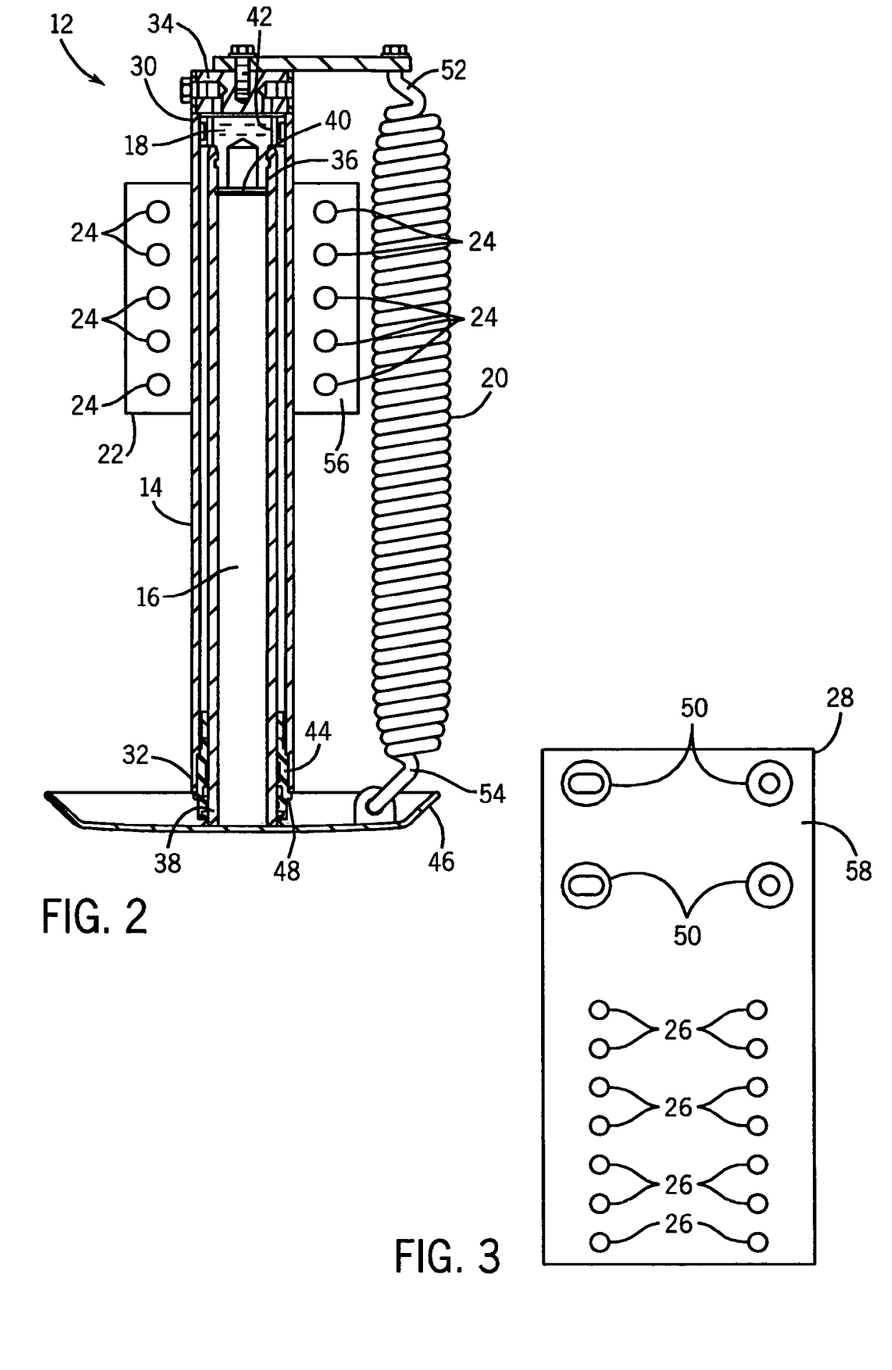
FIG. 2 is an elevational, sectional view of a leveling leg of FIG. 1 in a retracted position.
FIG. 3 is a front plan view of a second bracket compatible with the leveling leg of FIG. 2.
Figure 4:
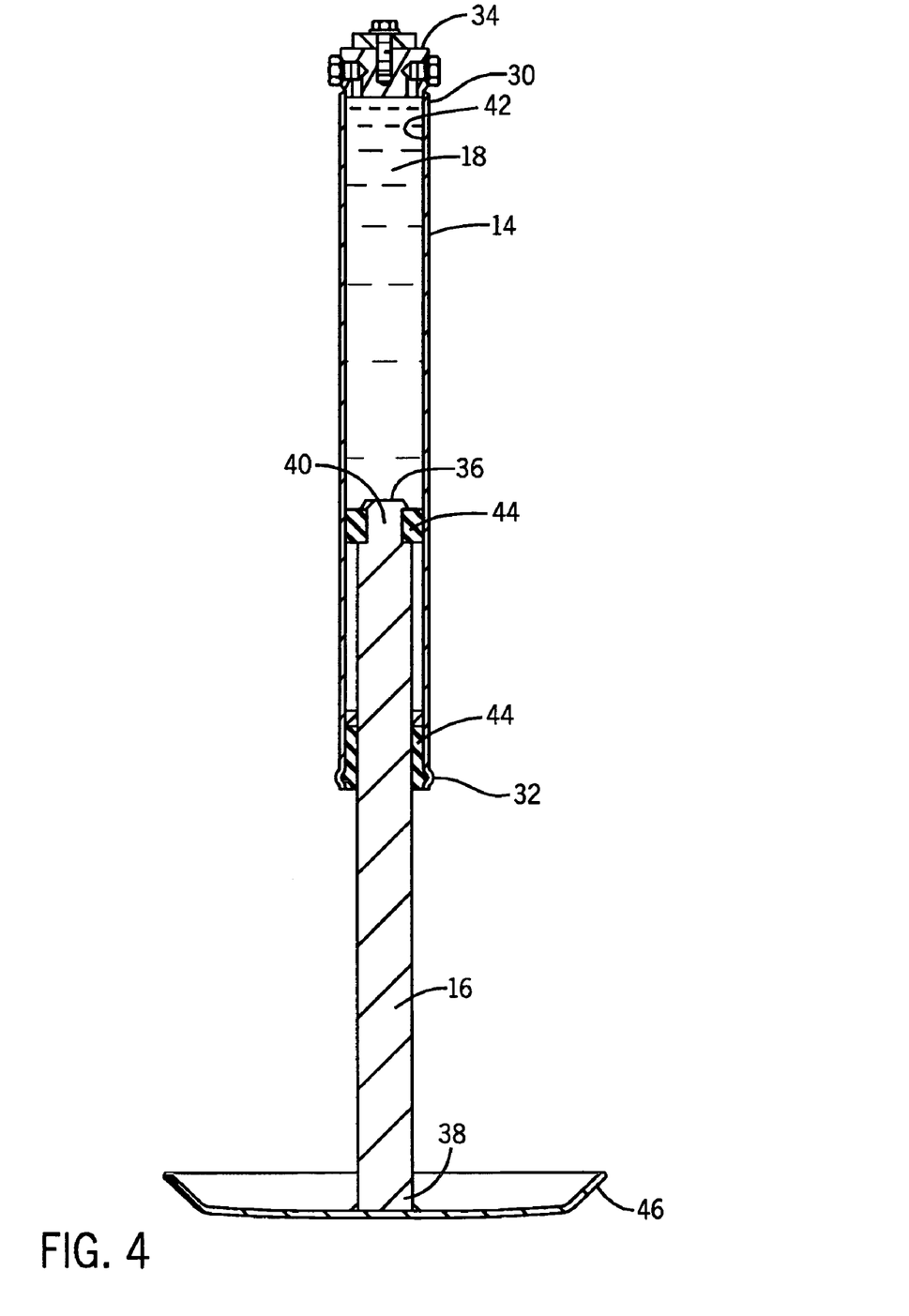
FIG. 4 is an elevational, sectional view of the leveling leg of FIG. 2 in the extended position.

The tube shaped outer member 14 has open first and second ends 30, 32. The first end 30 is closed by a valve member 34 that allows the passage of the hydraulic fluid 18 into and out of the outer member 14. The valve member 34 is sealingly mounted to the outer member first end 30, using methods known in the art, such as welding, threadable engagement, and the like. Preferably, the outer member 14 is a tube having a circular cross section, formed from steel or other suitable material having similar strength characteristics. Moreover, although a round tube is described herein, any shaped tube, such as a square tube, may be used without departing from the scope of the present invention.

The inner member 16 has a shape corresponding to the outer member 14 with a first end 36 disposed inside the outer member 14 and a second end 38 extending out of the outer member second end 32. The outer dimensions of the inner member 16 are proportioned so as to form a sliding fit within the inside dimensions of the outer member 14. The inner member 16 is telescopically driven toward the extended position by a driving means that urges the inner member 16 telescopically out of the to outer member second end 32.

In the preferred embodiment, the inner member 16 is telescopically driven by a driving means including the hydraulic fluid 18 pumped into the outer member 14. The preferred driving means includes a piston 40 fixed to the inner member 16 proximal the inner member first end 36. The piston 40 closes the inner member first end 36, and in cooperation with the outer member 14 and valve member 34 defines an expandable reservoir 42 for receiving the hydraulic fluid 18 through the valve member 34. Hydraulic fluid 18 pumped into the expandable reservoir 42 through the valve member 34 urges the inner member 16 telescopically out of the outer member second end 32. Although driving means including hydraulic fluid is preferred, other driving means known in the art, such as a screw jack, rack and pinion, pneumatic, and the like can be used without departing from the scope of the invention.

Seal members 44 interposed between the inner and outer members 14, 16 prevent hydraulic fluid 18 from leaking out of the expandable reservoir 42 between the inner and outer members 14, 16. In one embodiment shown in FIG. 2, the seal member 44 is fixed relative to outer member 14 proximal the outer member second end 32 to allow for the maximum extension of the inner member 16 In another embodiment shown in FIGS. 4-6, a seal member 44 is fixed to the inner member 16 proximal the inner member first end 36 and sealingly engages the outer member 14. Any number of seal members 44 can be provided at any position on either the inner and outer members 14, 16 without departing from the scope of the invention.

A foot 46 mounted to the inner member second end 38 engages the ground, or other supporting surface, to support the vehicle 10. The foot 46 provides a large surface area for engagement with the ground to prevent the leveling leg assembly 12 from sinking or forming a depression in the ground. Preferably, the foot 46 is pivotally mounted to the inner member 16 by a pin 48 inserted through a pair of opposing holes formed through the inner member 16. Advantageously, by pivotally mounting the foot 46 to the inner member 16, the foot 46 pivots to accommodate an uneven ground or other non-level supporting surface.

The return spring 20 has one end 52 fixed to relative to the outer member 14 and an opposing end 54 fixed to the foot 46 urges the inner member 16 back into the outer member 14 to the retracted position. Although an external tension coil spring is shown, other mechanisms for urging the inner member toward the retracted positions can be provided, such as an internal spring disposed in the outer member, a hydraulic actuator, and the like, without departing from the scope of the invention. Moreover, although one end of the spring is fixed to the outer member and the opposing end is fixed to the foot, if the spring is provided, the ends of the spring can be fixed to any object that allows the spring to urge the inner member toward the retracted position. For example, one end of the spring can be fixed to the vehicle and the opposing end can be fixed to the inner member.

The first bracket 22 fixed, such as by welding, to the outer member 14 includes a plate 56 having the first plurality of hole pairs 24 formed therethrough. The plate 56 shown in FIG. 2 is planar, however, the plate 56 can have any shape, such as disclosed in FIGS. 7 and 8, without departing from the scope of the invention. Although welding the first bracket 22 to the outer member 14 is shown, other methods for fixing the first bracket 22 relative to the outer member 14, such as clamps, bolts, and the like, can be used without departing from the scope of the invention. The first bracket 22 mates with the second bracket 28 to fix the outer member 14 relative to the vehicle 10.

The second bracket 28 is bolted to the vehicle 10, and includes a plate 58 having the second plurality of hole pairs 26 formed therethrough. Additional holes 50 can be provided for bolting the second bracket 28 to the vehicle 10 using bolts 51. At least one of the hole pairs 24 of the first plurality of hole pairs 24 is aligned with a hole pair 26 of the second plurality of hole pairs 26, and a bolt 60, or pin, is inserted through each hole of the aligned hole pairs 24, 26 to fix the outer member 14 relative to the vehicle 10. Advantageously, the hole pairs 24, 26 that are aligned can be selected to correspond to a desired outer member height relative to the ground. Although hole pairs are disclosed and preferred, individual alignable holes can be provided depending upon the particular application and load capacity without departing from the scope of the invention.

Figures 5, 6:
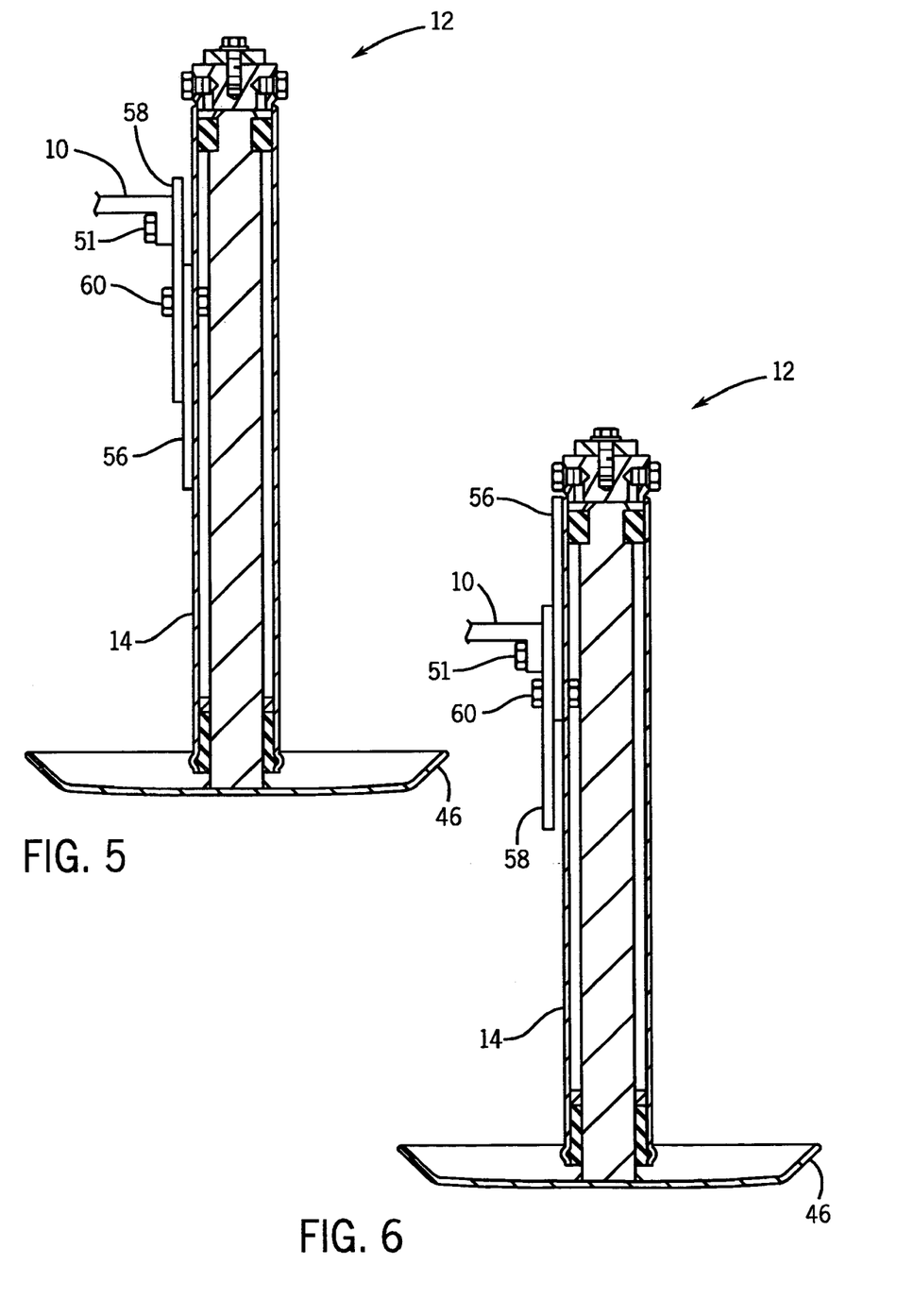
FIG. 5 is a side sectional view of the leveling gear of FIG. 2 fixed to the vehicle at a first height relative to the vehicle.
FIG. 6 is a side sectional view of the leveling gear of FIG. 2 fixed to the vehicle at a second height relative to the vehicle.

Advantageously, the first and second plurality of hole pairs 24, 26 provides a leveling leg assembly 12 having a lower position, shown in FIG. 5, and an upper position, shown in FIG. 6. The lower position is accomplished by aligning the lowest hole pair 26 in the second bracket 28 with the highest hole pair 24 in the first bracket 22, and then bolting, or pinning, the brackets 22, 28 together to fix the leveling leg assembly 12 relative to the vehicle 10. The upper position is accomplished by aligning the highest hole pair 26 in the second bracket 28 with the lowest hole pair 26 in the first bracket 22, and then bolting, or pinning, the brackets together to fix the leveling leg assembly 12 relative to the vehicle 10. Intermediate positions are accomplished by aligning various combinations of the hole pairs 24, 26, and bolting, or pinning, the brackets 22, 28 together to fix the leveling leg assembly 12 relative to the vehicle 10. Advantageously, except in the case in which all of the hole pairs 24 formed in the first bracket 22 are aligned with all of the hole pairs 26 formed in the second bracket 28 are aligned, at least one hole pair 24, 26 in one of the brackets 22, 28 is not aligned with a hole pair 24, 26 in the other bracket 22, 28 to provide an alternate mounting position for the bracket at an alternate height of the first bracket 22, and thus the outer member 14, relative to the vehicle.

Advantageously, bolting the second bracket 28 to the vehicle 10 provides a bolt on-bolt on assembly that has advantages over prior at leveling leg assemblies that are welded to a vehicle. In particular, bolting the second bracket 28 to the vehicle 10, and then bolting, or pinning, the first bracket 22 to the second bracket 28 allows the second bracket 28 to be detachably fixed at a desired height relative to the vehicle 10 and the first bracket 22 is then detachably fixed to the second bracket 28 at the desired height. This bolt on-bolt on assembly allows the height of the leveling leg assembly 12 relative to the vehicle 10 to be adjusted after installation by removing and rebolting either the second bracket 28 to the vehicle 10 or the first bracket 22 to the second bracket 28 depending upon the amount of height adjustment required. Of course, the second bracket 28 can be welded to the vehicle 10 if the ability to detach the second bracket 28 from the vehicle 10 is not desired. Moreover, once the first bracket 22 is bolted, or pinned, relative to the second bracket 28, the first bracket 22 can be welded to the second bracket 28 or vehicle 10 if the ability to adjust the height of the first bracket 22 relative to the second bracket 28 is not desired.

Figures 7, 8:
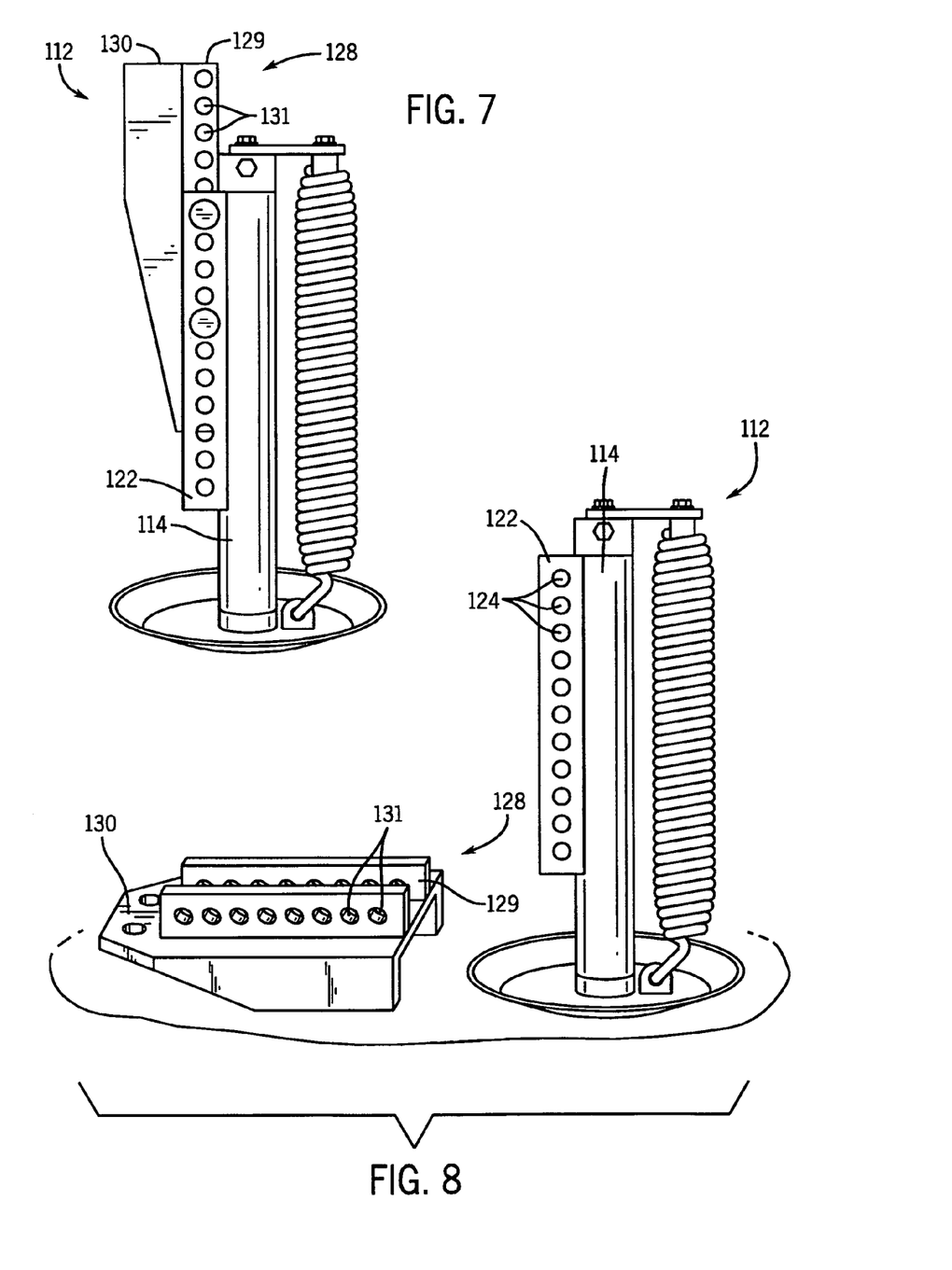
FIGS. 7 and 8 are perspective views of an alternate embodiment of a leveling leg assembly incorporating the present invention.

In an alternate embodiment shown in FIGS. 7 and 8, a leveling leg assembly 112 includes a first bracket 122 formed from a length of tube steel welded to the outer member 114. The first bracket 122 includes a plurality of hole pairs 124 formed through opposite sides of the tube. The second bracket 128 includes a channel 129 fixed to a substantially planar plate 130. The channel 129 includes a pair of parallel legs 131 having pairs of holes 126 that are alignable with the hole pairs 124 formed in the tube fixed to the outer member 114.

Figure 9:
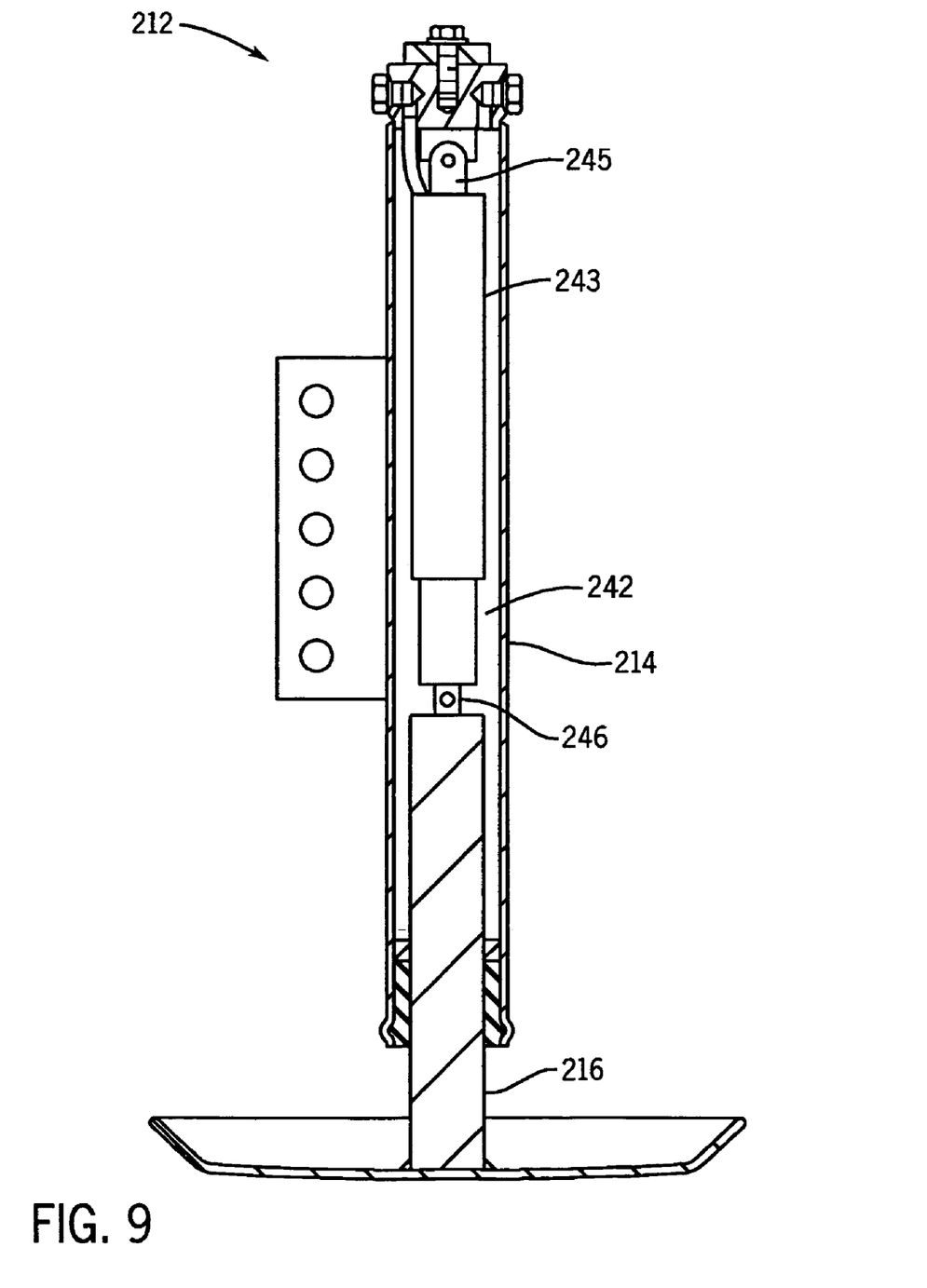
FIG. 9 is a elevational, sectional view of another alternate embodiment of a leveling leg incorporating the present invention.

In another alternate embodiment shown in FIG. 9, a leveling leg assembly 212 includes inner and outer members 216, 214 that define an expandable cavity 242. A hydraulic actuator 243 disposed in the cavity 242 includes one end 245 fixed relative to the outer member 214 and an opposing end 246 fixed to the inner member 216. Actuation of the hydraulic actuator 243 urges the inner member 216 telescopically out of the outer member 214. The hydraulic actuator 243 is a self-contained expandable reservoir that is in fluid communication, such as by a hose, with a source of pressurized hydraulic fluid to actuate the actuator 243. As a result, a sealing member interposed between the inner and outer members is not required. Moreover, if a double acting hydraulic cylinder is used, a return spring is also not required.

While there has been shown and described what are at present considered the preferred embodiment of the invention, it will be obvious to those skilled in the art that various changes and modifications can be made therein without departing from the scope of the invention.

I claim:

1. A leveling leg assembly adapted for mounting to a vehicle, said assembly comprising:
   an outer member;
   an inner member telescoped slidably into said outer member; said inner member having a first end extending beyond said outer member;
   means for driving said inner member telescopically out of said outer member from a retracted position toward an extended position;
   a first bracket fixed to said outer member; and
   a second bracket fixable to the vehicle, wherein one of said first and second brackets has a plurality of holes formed therethrough, and the other of said first and second brackets has at least one hole formed therethrough that is aligned with at least one of said plurality of holes to fix said first bracket relative to said second bracket at a desired height relative to the vehicle, wherein at least one hole of said plurality of holes formed through said one of said first and second brackets is not aligned with said at least one hole formed through the other of said first and second brackets, and wherein alignment of said at least one hole of said plurality of holes formed through said one of said first and second brackets which is not aligned with said at least one hole formed through the other of said first and second brackets provides an alternate mounting height for said first bracket relative to the vehicle.

2. The leveling leg assembly as in claim 1, in which said at least one hole is aligned with said at least one of said plurality of holes, and said first and second brackets are fixed relative to each other by a bolt extending through said aligned holes.

3. The leveling leg assembly as in claim 1, wherein said one of said first and second brackets has a plurality of hole pairs formed therethrough, and the other of said first and second brackets has at least one hole pair formed therethrough that is alignable with at least one of said plurality of hole pairs to fix said first bracket relative to said second bracket at a desired height relative to the vehicle.

4. The leveling leg assembly as in claim 1, further comprising a foot mounted to said first end of said inner member.

5. The leveling leg assembly as in claim 4, in which said foot is pivotally fixed to said first end of said inner member.

6. The leveling leg assembly as in claim 1, in which said means for driving said inner member telescopically out of said outer member includes hydraulic fluid.

7. The leveling leg assembly as in claim 6, in which an expandable reservoir defined in part by said outer member receives said hydraulic fluid to drive said inner member telescopically out of said outer member toward said extended position.

8. The leveling leg assembly as in claim 7, in which at least one sealing member is interposed between said inner member and said outer member.

9. The leveling leg assembly as in claim 6, in which a hydraulic actuator interposed between said inner and outer member receives said hydraulic fluid to drive said inner member telescopically out of said outer member toward said extended position.

10. The leveling leg assembly as in claim 1, in which a return spring having one end fixed relative to said outer member and an opposing end fixed relative to said inner member urges said inner member from said extended position toward said retracted position.

11. A leveling leg assembly adapted for mounting to a vehicle, said assembly comprising:
    an outer member;
    an inner member telescoped slidably into said outer member; said inner member having a first end extending beyond said outer member;
    an expandable chamber interposed between said inner and outer members for receiving a fluid for driving said inner member telescopically out of said outer member from a retracted position toward an extended position;
    a first bracket fixed to said outer member; and
    a second bracket fixable to the vehicle, wherein one of said first and second brackets has a plurality of holes formed therethrough, and the other of said first and second brackets has at least one hole formed therethrough that is aligned with at least one of said plurality of holes to fix said first bracket relative to said second bracket at a desired height relative to the vehicle, wherein at least one hole of said plurality of holes formed through said one of said first and second brackets is not aligned with said at least one hole formed though the other of said first and second brackets, and wherein alignment of said at least one hole of said plurality of holes formed though said one of said first and second brackets which is not aligned with said at least one hole formed though the other of said first and second brackets provides an alternate mounting height for said first bracket relative to the vehicle.

12. The leveling leg assembly as in claim 11, in which said at least one hole is aligned with said at least one of said plurality of holes, and said first and second brackets are fixed relative to each other by a bolt extending through said aligned holes.

13. The leveling leg assembly as in claim 11, wherein said one of said first and second brackets has a plurality of hole pairs formed therethrough, and the other of said first and second brackets has at least one hole pair formed therethrough that is alignable with at least one of said plurality of hole pairs to fix said first bracket relative to said second bracket at a desired height relative to the vehicle.

14. The leveling leg assembly as in claim 11, further comprising a foot mounted to said first end of said inner member.

15. The leveling leg assembly as in claim 14, in which said foot is pivotally fixed to said first end of said inner member.

16. The leveling leg assembly as in claim 11, in which said fluid is hydraulic fluid.

17. The leveling leg assembly as in claim 11, in which at least one sealing member is interposed between said inner member and said outer member.

18. The leveling leg assembly as in claim 11, in which said expandable chamber is defined by a hydraulic actuator interposed between said inner and outer member.

19. The leveling leg assembly as in claim 11, in which a return spring having one end fixed relative to said outer member and an opposing end fixed relative to said inner member urges said inner member from said extended position toward said retracted position.

20. A leveling leg assembly adapted for mounting to a vehicle, said assembly comprising:
   an actuator;
   a first bracket fixed to said actuator; and
   a second bracket fixable to the vehicle by bolting, wherein one of said first and second brackets has a plurality of holes formed therethrough, and the other of said first and second brackets has at least one hole formed therethrough that is aligned with at least one of said plurality of holes to fix said first bracket relative to said second bracket at a desired height relative to the vehicle, wherein at least one hole of said plurality of holes formed through said one of said first and second brackets is not aligned with said at least one hole formed through the other of said first and second brackets, and wherein alignment of said at least one hole of said plurality of holes formed through said one of said first and second brackets which is not aligned with said at least one hole formed through the other of said first and second brackets provides an alternate mounting height for said first bracket relative to the vehicle.

21. The leveling leg assembly as in claim 20, in which said at least one hole is aligned with said at least one of said plurality of holes, and said first and second brackets are fixed relative to each other by a bolt extending through said aligned holes.

22. The leveling leg assembly as in claim 20, wherein said one of said first and second brackets has a plurality of hole pairs formed therethrough, and the other of said first and second brackets has at least one hole pair formed therethrough that is alignable with at least one of said plurality of hole pairs to fix said first bracket relative to said second bracket at a desired height relative to the vehicle.

23. The leveling leg assembly as in claim 20, further comprising a foot mounted to an extendible member of said actuator.

24. The leveling leg assembly as in claim 23, in which said foot is pivotally fixed to said extendible member.

25. The leveling assembly as in claim 20 in which said actuator includes an outer member, an inner member telescoped slidably into said outer member, and means for driving said inner member telescopically out of said outer member from a retracted position toward an extended position.

26. The leveling leg assembly as in claim 25, in which said means for driving said inner member telescopically out of said outer member includes hydraulic fluid.

27. The leveling leg assembly as in claim 26, in which an expandable reservoir defined in part by said outer member receives said hydraulic fluid to drive said inner member telescopically out of said outer member toward said extended position.

28. The leveling leg assembly as in claim 27, in which at least one sealing member is interposed between said inner member and said outer member.

29. The leveling leg assembly as in claim 26, in which a hydraulic actuator interposed between said inner and outer member receives said hydraulic fluid to drive said inner member telescopically out of said outer member toward said extended position.

30. The leveling leg assembly as in claim 20, in which a return spring having one end fixed relative to said outer member and an opposing end fixed relative to said inner member urges said inner member from said extended position toward said retracted position.

\* \* \* \* \*

UNITED STATES PATENT AND TRADEMARK OFFICE
CERTIFICATE OF CORRECTION

| | | |
|---|---|---|
| PATENT NO. | : 7,296,784 B2 | Page 1 of 1 |
| APPLICATION NO. | : 11/005254 | |
| DATED | : November 20, 2007 | |
| INVENTOR(S) | : Gary D. Peter | |

It is certified that error appears in the above-identified patent and that said Letters Patent is hereby corrected as shown below:

Column 6, Lines 61, 63, 65 Claim 11: "though" should be -- through --

Signed and Sealed this

Twelfth Day of August, 2008

JON W. DUDAS
*Director of the United States Patent and Trademark Office*